US012586093B2

(12) United States Patent
Ding et al.

(10) Patent No.: US 12,586,093 B2
(45) Date of Patent: Mar. 24, 2026

(54) SYSTEMS AND METHODS FOR FACILITATING NETWORK CONTENT GENERATION VIA A DYNAMIC MULTI-MODEL APPROACH

(71) Applicant: Stripe, Inc., San Francisco, CA (US)

(72) Inventors: Mengjie Ding, New York, NY (US); Bo Xu, Dublin, CA (US); Jack Dent, San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 0 days.

(21) Appl. No.: 18/669,203

(22) Filed: May 20, 2024

(65) Prior Publication Data

US 2025/0356251 A1 Nov. 20, 2025

Related U.S. Application Data

(63) Continuation of application No. 17/494,453, filed on Oct. 5, 2021, now abandoned.

(51) Int. Cl.
*G06N 20/00* (2019.01)
*G06Q 30/0202* (2023.01)

(52) U.S. Cl.
CPC ......... *G06Q 30/0202* (2013.01); *G06N 20/00* (2019.01)

(58) Field of Classification Search
CPC .................................................... G06N 20/00
See application file for complete search history.

(56) References Cited

U.S. PATENT DOCUMENTS

2023/0106398 A1* 4/2023 Ding .................... G06N 20/00
705/7.31

FOREIGN PATENT DOCUMENTS

CN 109814905 A 5/2019

OTHER PUBLICATIONS

Extended European Search Report on EPO Application No. 22865562. 7-1203 dated Oct. 25, 2024 (11 pages).

* cited by examiner

*Primary Examiner* — Kevin W Figueroa
(74) *Attorney, Agent, or Firm* — Foley & Lardner LLP

(57) ABSTRACT

In some embodiments, a multi-model approach may be utilized to produce predictions with greater accuracy, which may then be used to generate content for one or more entities. In some embodiments, such models may include one or more machine learning models, heuristic models, exponential smoothing models, and/or other models. As an example, based on a processing volume corresponding to user data associated with a user, a first model may be selected for processing the user data over use of a second model for processing the user data. As such, based on the selection of the first machine learning model, the user data may be inputted into the first machine learning model to obtain a predicted result related to the user. Based on the predicted result, content for the user may be generated for display on a user device associated with the user.

20 Claims, 4 Drawing Sheets

SYSTEMS AND METHODS FOR FACILITATING NETWORK CONTENT GENERATION VIA A DYNAMIC MULTI-MODEL APPROACH

SUMMARY

In some embodiments, a multi-model approach may be utilized to leverage strengths of the models, while mitigating their weaknesses, to produce predictions with greater accuracy, which may then be used to generate content for one or more network users. For example, given the greater accuracy of the predictions, the system may generate respective content that is appropriately tailored for different entities.

In some embodiments, the multi-model approach may involve selecting different models based on processing tenure, processing volume, and/or other factors. In some embodiments, such models may include one or more machine learning models, heuristic models, exponential smoothing models, and/or other models. In one example, with respect to a content request related to a user, a processing volume corresponding to user data associated with the user may be determined. Based on the processing volume associated with the user, a first machine learning model (or other model) may be selected for processing the user data (e.g., selected over use of another model for processing the user data). As such, based on the selection of the first machine learning model, the user data may be inputted into the first machine learning model to obtain a predicted result related to the user. Based on the predicted result, content for the user may be generated for display on a user device associated with the user. In this way, for example, the generated content may be appropriately tailored for the user by improving the accuracy of the predicted result related to the user (e.g., via dynamic selection of the machine learning model for processing the user data based on the processing volume associated with the user and/or other factors).

In some embodiments, the model selection may be based on processing volume without relying on tenure length. As an example, processing volume may be used to determine whether a heuristic model or a machine learning model (e.g., of a plurality of stored models) may be used for prediction. In some embodiments, the model selection may additionally or alternatively be based on tenure length. For example, for entities with shorter histories (e.g., less than a 52-week record with the system), an exponential smoothing model may be selected for processing the entity data of the respective entity. In one use case, if the entity's initial transaction record occurred less than a year ago, the exponential smoothing model may be selected for processing the entity data. In this way, for example, the combination of processing volume and/or tenure length ensures that the selected predictive model aligns well with the respective entity's record history, providing the most accurate predictions related to the entity. In one instance, heuristic modeling can offer better predictions for low-volume entities, whereas machine learning models may perform more accurately for high-volume entities. In another instance, exponential smoothing may yield better predictions for entities with shorter histories, as compared to certain heuristic or machine learning models in such scenarios.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
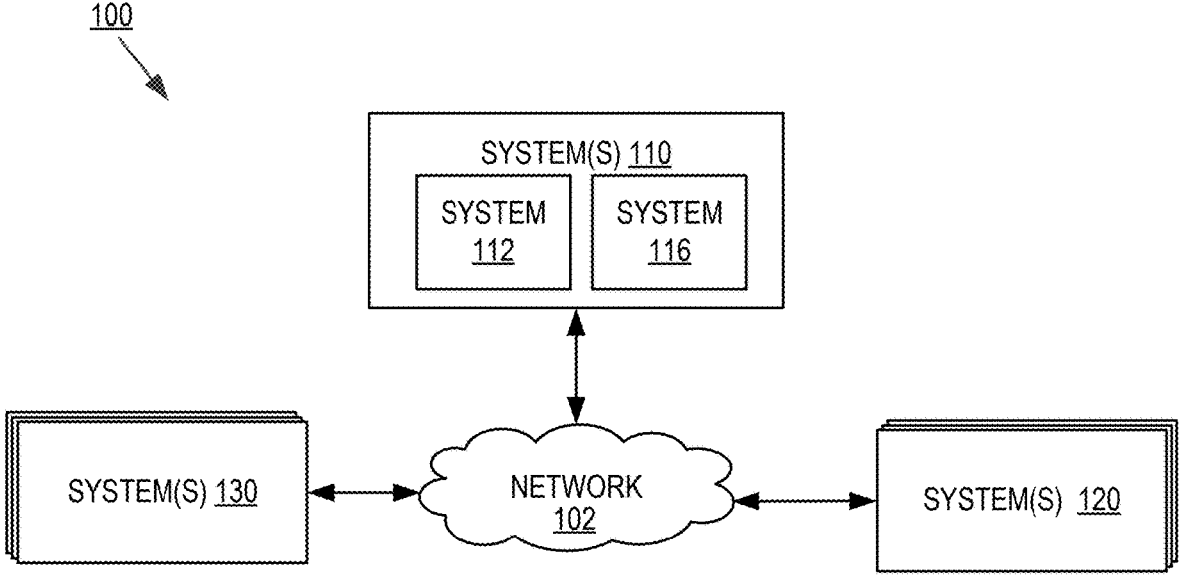
FIG. 1 is a block diagram of a system leveraging a multi-model approach to produce predictions with greater accuracy and generating tailored content based on such predictions, in accordance with one or more embodiments.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "accessing", "generating", "determining", "selecting", "applying", "transmitting", "receiving", "tuning", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of a system 100 leveraging a multi-model approach to produce predictions with greater accuracy and generating tailored content based on such predictions, in accordance with one or more embodiments. As discussed above, some embodiments may utilize a multi-model approach to leverage strengths of the models, while mitigating their weaknesses, to produce predictions with greater accuracy, which may then be used to generate content for one or more entities. For example, given the greater accuracy of the predictions, such embodiments may generate respective content that is appropriately tailored for different entities.

In some embodiments, the multi-model approach may involve selecting different models based on processing tenure, processing volume, and/or other factors. As an example, such models may include one or more machine learning models, heuristic models, exponential smoothing models, and/or other models. In one example, the system 100 may select a first model for processing user data associated with a user (e.g., selecting the first model over use of another model for processing the user data) based on a processing volume corresponding to the user data, a tenure length corresponding to the user data, or other factors. As such, based on the selection of the first model, the system 100 may input the user data into the first model to obtain a predicted result related to the user. Based on the predicted result, the system 100 may generate content for the user for display on a user device associated with the user. In this way, for example, the system 100 may generate content appropriately tailored for the user by improving the accuracy of the predicted result related to the user (e.g., via dynamic selection of the machine learning model for processing the user data).

In some embodiments, the system 100 may perform the model selection based on processing volume without relying on tenure length. As an example, processing volume may be used to determine whether a heuristic model or a machine learning model (e.g., of a plurality of stored models) may be used for prediction. In some embodiments, the model selection may additionally or alternatively be based on tenure length. For example, for entities with shorter histories (e.g., less than a 52-week record with the system), an exponential smoothing model may be selected for processing the entity data of the respective entity. In one use case, if the entity's initial transaction record occurred less than a year ago, the exponential smoothing model may be selected for processing the entity data. In another use case, weekly transaction processing totals may be generated for the entity (processing block 404). From these weekly totals, a historical record of processing volume may be created for each entity, including average weekly processing volume, weekly totals, and other time-based processing totals (e.g., 3-month, 12-month, and other cumulative totals). Additionally, the entity's tenure (e.g., with a given platform) may be determined from the weekly totals (e.g., reflecting how long the entity has been using the platform, such as more than a year, within the past calendar year, etc.).

In this way, for example, the combination of processing volume and/or tenure length ensures that the selected predictive model aligns well with the respective entity's record history, providing the most accurate predictions related to the entity. In one instance, heuristic modeling can offer better predictions for low-volume entities, whereas machine learning models may perform more accurately for high-volume entities. In another instance, exponential smoothing may yield better predictions for entities with shorter histories, as compared to certain heuristic or machine learning models in such scenarios.

In one embodiment, the system 100 includes commerce platform system(s) 110, one or more merchant system(s) 120, and one or more user system(s) 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system(s) 110 and merchant system(s) 120 may also be one or more computing devices, such as one or more server computer systems, desktop computer systems, etc. that utilize distributed computing architectures.

The commerce platform system(s) 110, merchant system(s) 120, and merchant user system(s) 130 may be coupled to a network 102 and communicate with one another using any of the standard protocols for the exchange of information, including secure communication protocols. In one embodiment, one or more of the commerce platform system(s) 110, merchant system(s) 120, and user system(s) 130 may run on one Local Area Network (LAN) and may be incorporated into the same physical or logical system, or different physical or logical systems. Alternatively, the commerce platform system(s) 110, merchant system(s) 120, and merchant system(s) 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or user system(s) 130. For example, commerce platform system(s) 110 may manage merchant accounts held at the commerce platform, run financial transactions initiated at user system(s) 130 performed on behalf of a merchant system 120, clear transactions, performing payouts to merchants and/or merchants' agents, manage merchant and/or agent accounts held at the commerce platform system(s) 110, as well as other services typically associated with commerce platforms systems such as, for example, STRIPE™. For commerce platform systems that operate at scale, such as system 110, the number of transactions on the magnitude of millions or billions of transactions are processed each hour, day, month, etc. by the transaction system 112. Each of these transactions is processed by the transaction system 112 of commerce platform system(s) 110, and data associated with the transaction is stored in a data store of the commerce platform system (e.g., transaction data store 212 discussed below).

Commerce platform system(s) 110, in embodiments leverages the transaction data generated for each merchant to improve the technical ability of the commerce platform to offer additional services to merchant system(s) 120, reduce merchant effort in seeking the additional services, and improve the accuracy of the predictions that form the basis upon which such services are offered. That is, commerce platform 110 uses its unique position within the modern network-based transaction processing environment, as well as its functions performed within that environment, to generate a new approach and improved solution to additional service offerings. In an embodiment, the additional services may include the extension of a loan or credit to a merchant system. For example, the credit or loan may be offered to the merchant system for use in growing, maintaining, or otherwise to benefit the ongoing operations of the business of the merchant system. However, the techniques discussed herein are not limited to loan and credit offerings, as any service that can be extended to a merchant system from the commerce platform system(s) 110 based on revenue forecasting may use and benefit from the improvements discussed herein.

As discussed herein, transaction system 112 processes user system-merchant system transactions on behalf of merchant system(s) 120. Such transactions can include product purchases, service performance, subscriptions, etc. Transaction system 112, for each transaction, may therefore collect payment information, process payments with third parties (e.g., credit systems, banking systems, etc.), generate transaction completion information, credit merchant accounts, perform payouts (e.g., to agents of a merchant), as well as other processes associated with transaction and payment processing. Furthermore, transaction system 112 stores merchant data associated with each of these operations for each transaction within a data store of the commerce platform system(s) 110 so that a complete picture of a merchant's activities using the commerce platform system(s) 110 is available.

In embodiments, forecast manager 116 accesses the transaction data generated by the transaction system 112 when determining whether to offer additional services to a merchant system. As will be discussed in greater detail herein, forecast manager 116 leverages the transaction data generated by the transaction system 112 to forecast a predicted revenue for one or more merchants upon which additional service offers may be based. That is, the modern network based transaction environment of the commerce platform system(s) 110 generates transaction data which may be used by forecast manager 116 to forecast future revenue of a merchant system. This revenue forecast may then be used by the commerce platform system(s) 110 to determine whether and under what conditions an additional service may be offered to a merchant system. As discussed herein, for example, the additional services may be a loan or credit services, but such services are not limited to these. For credit and/or loan services, an amount of the offer extended to a merchant system is critical. That is, an offer that is too low will not provide a merchant the full offer they are entitled to, which may hinder the merchant's ongoing business, growth of their business, etc. An offer that is too high exposes the commerce platform system to increased and/or unacceptable levels of risk. Additional service offering factors, such as repayment time, fees, interest rates, etc. also impact the suitability of an offered service. Thus, the improved forecasting discussed herein ensures that the forecasted revenue of a merchant system does not result in an offer that is not too low, ensures that the commerce platform system(s) 110 risk is not unduly high by not generating forecasts that would lead to offers that are too high, and ensures additional offer factors accurately reflect a merchant's position with the commerce platform.

In embodiments, to obtain this improved revenue forecast upon which additional services may be offered to merchant system(s) 120, forecast manager 116 utilizes the transaction data generated by transaction system 112 to predict merchant revenue for a period of time (e.g., 1 month, 6 months, 1 year, etc.). That is, forecast manager 116 accesses the transaction records for each merchant system to determine historic transaction processing volume and transaction totals for each merchant system over a period of time, such as over a prior year or other tenure of a merchant system's usage of the transaction system 112. Then, utilizing a revenue modeling approach selected from a set of forecasting models, where the selection is determined based on merchant revenue conditions, each merchant's historic revenue data is used to forecast that merchant's future revenue. As discussed herein, the efforts imposed on merchants with such an approach is minimized and/or reduced entirely, as the commerce platform system(s) 110 may predict revenue and generate service offers directly from the transaction data, thereby eliminating the need of a merchant to provide service application information as required by traditional approaches. Furthermore, the accuracy of the revenue forecasting is greatly improved due to the use of actual merchant revenue information (e.g., stored within the transaction records generated by transaction system 112 during actual merchant-user system transactions), as well as due to the use of a multi-model approach where different models are selected based on factors of a merchants processing tenure and processing volume with the commerce platform system 110.

Therefore, the forecast manager 116 is able to leverage the unique position of the commerce platform system(s) 110 to improve the revenue forecasting (i.e., data basis) upon which service offers may be generated and extended to merchant system(s) 120. In other words, the technical environment of the commerce platform system(s) 110, the data generated within the environment during merchant-user system transactions, and the specific approach to revenue forecast generation allow for a new technical solution to revenue forecasting and service offering that arises out of the modern distributed transaction processing environment.

Figure 2:
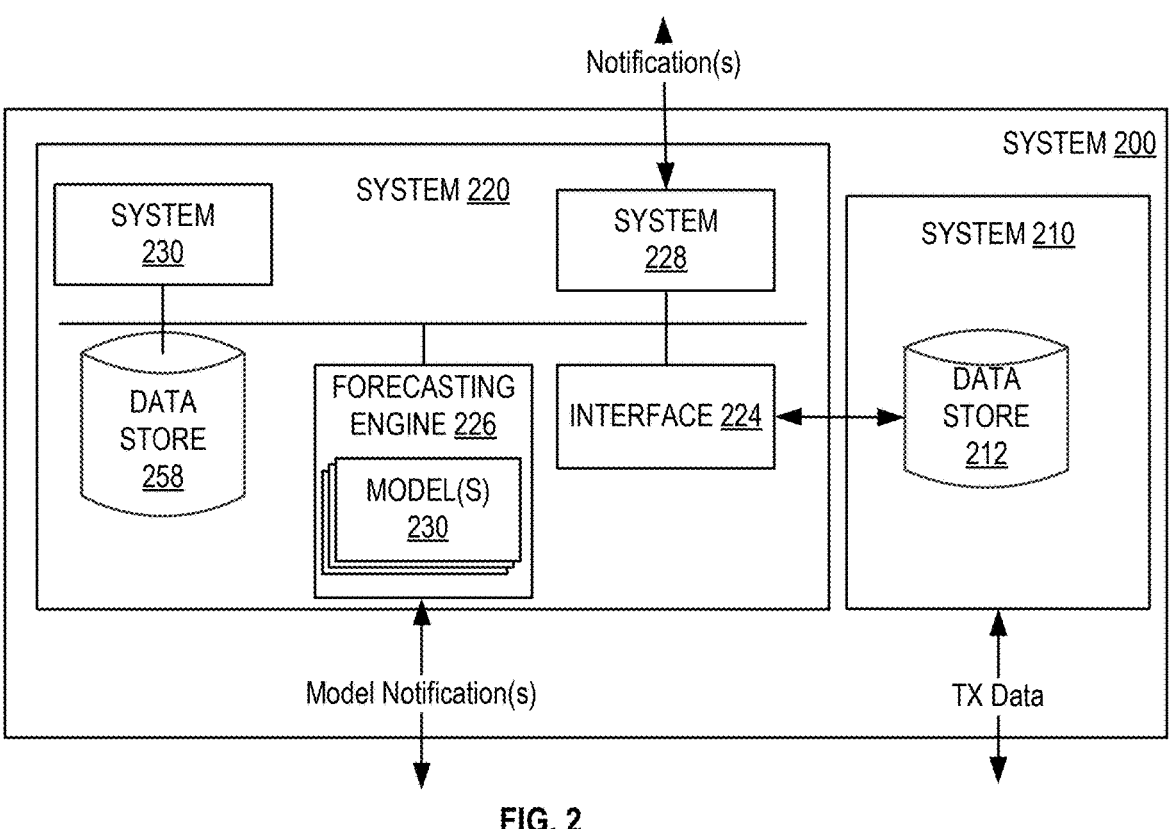
FIG. 2 is a block diagram a forecast manager of a commerce platform system, in accordance with one or more embodiments.

FIG. 2 is a block diagram a forecast manager 220 of a commerce platform system 200, in accordance with one or more embodiments. Commerce platform system 200 and forecast manager 220 provides additional details for the commerce platform system(s) 110 and forecast manager 116 discussed above in FIG. 1.

In one embodiment, commerce platform 200 includes a transaction processing system 210. In embodiments, the transaction processing system 210 is responsible for receiving and processing transactions originating from merchant system(s) (not shown) and user system(s) (not shown) over a communications network (e.g., network 102). For example, the transactions may be financial transactions performed by transaction processing system 210 including, but not limited to, purchases, refunds, credit requests, loan requests, subscriptions, etc.

Transaction processing system 210 maintains a transaction data store 212 with transaction records for each merchant that uses the services of the commerce platform system 210. The data store 212 may include a transaction record for each transaction processed by transaction processing system 210. Furthermore, as discussed above, each transaction record may include various data, including amount, identifiers for parties to the transaction, whether a transaction was performed by a merchant's agent, a payment method, a card type, a card brand, information entered for payment processing (e.g., shipping address, billing address, zip code of payment method/card, transaction total, tax information, etc.), as well as any other relevant transaction information. As a result, transaction data store 212 provides an accurate and historic record of transaction processing volume (e.g., amount totals of all transactions over a period of time, such as hourly, daily, weekly, quarterly, yearly, etc.) and transaction processing tenure (e.g., how long a particular merchant has used the services of the commerce platform system 200). Both of these factors, processing volume and merchant tenure, are used by forecast manager 220 when forecasting merchant revenue, and thus providing for service offerings.

In embodiments, revenue processor 230 of the forecast manager 220 is responsible for accessing transaction data from data store 212 via the transactions interface 224, and generating revenue totals for each merchant of the commerce platform system 200. In embodiments, transaction data store 212 stores millions or billions of transactions for a plurality of merchants over a relevant time period, such as a prior month, a prior quarter, a prior calendar year, etc. Thus, in embodiments revenue processor 230 utilizes a distributed computing approach where revenue totaling is processed in parallel by tasks, such that the tasks can be distributed to multiple physical processing resources. More specifically, revenue processor 230 spawns tasks, such as SPARK™ jobs, where each task or multiple tasks generate revenue totals for merchants. By distributing the processing using the task-based approach, the revenue totaling may be efficiently performed in parallel for multiple merchants on a periodic basis, such as hourly, daily, weekly, etc. basis using distributed processing resources.

The distributed jobs spawned by the revenue processor 230 are responsible for generating, in embodiments, periodic revenue totals for each merchant over a longer period of time. For example, and to illustrate the techniques discussed herein, weekly revenue totals over a prior calendar year are generated for each merchant and stored as data tables in revenue totals store 258. For merchants that have not used the commerce platform system 200 for a calendar year or longer, their weekly revenue totals are generated for the length of their tenure from a present time to a time of the merchant's first transaction. Furthermore, in embodiments, and to realize additional processing efficiencies, the distributed jobs perform updating of the merchant revenue data tables in revenue totals store 258, rather than complete re-computation. Furthermore, from these data tables, additional information is generated by the jobs for each merchant, including total processing volume of each merchant over the last 3 months, total processing volume of each merchant over the last 12 months for each, average weekly processing volume over last 12 months (or weekly totals of processing volume starting from a first transaction for a merchant with less than a year-long transaction history), tenure length of a merchant, as well as other information.

Revenue forecasting engine 226, which may also be implemented using the distributed job-based computing technique, is responsible for accessing the revenue totals data store 258 and generating revenue forecasts for each merchant of the commerce platform system 200. In an embodiment, a set of forecasting models 230 are used by revenue forecasting engine 226, and a selection of which forecasting model to use for a particular merchant is based on the data generated by the revenue processor 230.

Figure 3:
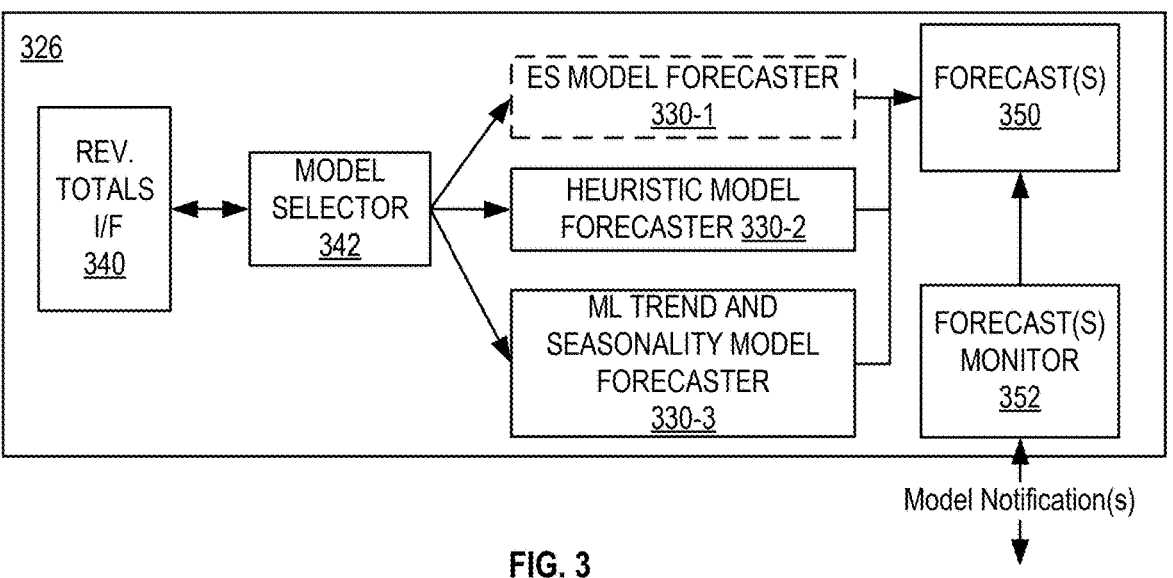
FIG. 3 is a block diagram a forecasting engine of the forecast manager of a commerce platform system, in accordance with one or more embodiments.

FIG. 3 is a block diagram of a revenue forecasting engine 326 and the forecasting model(s) 330-1 through 330-3, which provide additional details for the engine 226 and models 230 of FIG. 2, in accordance with one or more embodiments. In embodiments, revenue forecasting engine 326 includes several processes that may be implemented as hardware, software, or a combination, including a revenue totals interface 340, model selector 342, a plurality of different forecasters implementing different forecasting models (e.g., forecasters 330-1 through 330-3), forecasts 350, and a forecast(s) monitor 352. Each of these processes may be implemented as distributed jobs (or sets of jobs) so that multiple instances of each process may operate in parallel at the same or different physical resources when processing revenue forecasting for the merchants associated with commerce platform system 200.

As illustrated in FIG. 3, revenue forecasting engine 326 uses revenue totals interface 340 to access the data within revenue totals data store 258 and generated weekly revenue forecasts for each merchant. More specifically, the historic weekly totals, periodic processing volume totals, and tenure information, are accessed for each merchant and used for forecasting future weekly/periodic totals. In embodiments, the historic information is used for model selection as well as input data for the selected model, as discussed below.

Model selector 342 is responsible for using the processing volume totals and tenure information to select among a set for forecasting models (e.g., models 230). In an embodiment, a combination of tenure and processing volume is used to select an appropriate revenue forecasting model appropriate to the tenure/processing volume combination. In another embodiment, only processing volume is considered when selecting between different models. That is, in embodiments, different revenue forecasting models' accuracy in revenue prediction are impacted by the total amount processed (e.g., processing volume) for a given merchant and/or the amount of input data available (e.g., tenure). The set of forecasting models, in embodiments, includes an exponential smoothing model forecaster 330-1, a heuristic model forecaster 330-2, and machine learning trend and seasonality model forecaster 330-3, and selection by model selector 342 utilizes the decision factors in either Table 1 or Table 2.

TABLE 1

|  | Short Tenure (<52 weeks) and Long Tenure (>=52 weeks) |
| --- | --- |
| Low Processing Volume (<$100 k/yr) | Heuristic Modeling |
| High Processing Volume (>=$100 k/yr) | ML Modeling |

TABLE 2

|  | Short Tenure | Long Tenure |
| --- | --- | --- |
| Low Processing Volume | Exponential Smoothing | Heuristic Modeling |
| High Processing Volume | Modeling | ML Modeling |

As shown in Table 1 above, the tenure length is not relevant to model selection, whereas processing volume (e.g., based on a predetermined dollar amount, such as $100 k, $250 k, etc. per year) is determinative as to whether revenue forecasting will utilize a heuristic or ML based approach to revenue forecasting. Optionally, in Table 2, an exponential smoothing based approach is introduced for short tenure merchants, such as those with less than a 52-week history with the commerce platform (e.g., when a first merchant transaction is processed less than one year from a current date). In embodiments, the selected model based on the combination of processing volume and optionally tenure length ensures that the model-based forecasting applied to a particular merchant and that merchant's transaction history provides the most accurate forecast. In one embodiment, and with reference to Table 1, for low volume merchants, the heuristic modeling provides a more accurate prediction than the ML based modeling, whereas the ML based modeling provides more accurate weekly forecasting for high volume merchants. In another embodiment, and with reference to Table 2, the merchant's tenure may be used to further select exponential smoothing when they are a short tenure merchant, as exponential smoothing is more accurate than either the heuristic modeling or ML modeling for merchants with less available historical data.

Based on the selection criteria of Tables 1 or 2, model selector uses the determined tenure and processing volume to select between the various forecasters (e.g., exponential smoothing (ES) forecaster 330-1, heuristic model forecaster 330-2, and machine learning (ML) trend and seasonality model forecaster 330-2).

For short tenure merchants, model selector 342 selects ES model forecaster 330-1 that forecasts weekly revenue totals using an exponential smoothing based model using the merchant's available weekly revenue totals. The exponential smoothing model forecaster 330-1 is a time series forecasting method that smoothes time series data using an exponential window function. Exponential smoothing can be represented as:

$$F_T = \alpha Y_{T-1} + (1 - \alpha)F_{T-1}$$

In the above formula, $F_T$ is the forecasted periodic revenue total at time T (e.g., an hourly, daily, weekly, monthly, or other time incremental revenue total), $Y_{T-1}$ is the actual revenue total at time T−1, and $\alpha$ is a smoothing level. Furthermore, smoothing factor $\alpha$ typically has a value of $0<\alpha\leq1$. In one embodiment, the smoothing factor can be set to 0.1 allowing the applied exponential smoothing forecasts (e.g., forecasted weekly revenue totals) to be a weighted average of the time series of the merchant's periodic revenue totals, with higher weights allocated to the more recent periodic revenue totals For low processing volume merchants, that are either long tenure (e.g., Table 2 selection) or regardless of tenure (e.g., Table 1 selection), model selector 342 selects heuristic model forecaster 330-2 to generate a constant value for a merchant's predicted future weekly revenue from their historical weekly revenue totals. In embodiments, the forecast is X % of the merchant's average weekly volume over a past 52 weeks, where X is set based on the merchant's annualized 3-month to 12-month volume ratio, for example, (4*3-month processing volume)/12-month processing volume). Furthermore, X may be further adjusted based on the value of the ratio. In an embodiment, in response to an annualized ratio below 0.75, the average weekly volume is adjusted by a constant factor of 0.90 (e.g., 0.90*average weekly volume over a 12-month period). Similarly, and in embodiments, an annualized ratio between 0.75 and 1.00 is adjusted by a factor of 1.00, and an annualized ratio above 1.00 is adjusted by a factor of 1.15. In other words, the heuristic model forecaster 330-2 generates linear trend forecasts with a constant modifier based on the annualized ratio of 3-month to 12-month processing volume.

For high processing volume merchants, that are either long tenure (e.g., Table 2 selection) or regardless of tenure (e.g., Table 1 selection), model selector 342 selects ML trend and seasonality model forecaster 330-3 to generate a time series forecasted weekly totals. In an embodiment, the PROPHET™ forecasting tool may be utilized, with the historic revenue totals as input to the PROPHET™ forecasting tool. Furthermore, model hyperparamters may be selected for weekly revenue forecasts, such as linear growth, yearly seasonality and/or monthly seasonality for day-of-year and/or day-of-month seasonality adjustments, multiplicative seasonality such that merchant's revenue increase by y % yearly, and changepoint of prior scale to adjust flexibility of trend changes. Additionally, a cap and floor may be set by forecaster 330-3, such that predicated revenue cannot fall below a merchant's weekly average (e.g., cannot fall below 25%, 30%, etc. of a merchant's weekly average), and cannot exceed an adjusted annualized 3-month to 12-month volume ratio, such as when the ratio is below 1.00, the cap ensures the prediction cannot exceed 1.35*average weekly volume over 12 months. Similarly, when the ratio is between 1.00 and 1.25, the cap ensures the prediction cannot exceed 1.65*average weekly volume over 12 months. Further, when the ratio is between 1.25 and 1.50, the cap ensures the prediction cannot exceed 2.05*average weekly volume over 12 months. Additionally, when the ratio is above 1.50, the cap ensures the prediction cannot exceed 2.50*average weekly volume over 12 months.

As discussed above, model selector 342 selects a forecaster (e.g., 330-1 through 330-3) based on processing volume and optionally tenure length, where the model forecasts future weekly merchant revenue totals, for example the next 32, 45, 52, etc. weeks processing volumes, based on that merchant's past actual weekly revenue totals. The weekly revenue forecasts, per merchant, are then output by the selected forecaster to forecasts 350. In embodiments, forecasts may be stored in store 258 along with merchant weekly revenue totals, but may also be a different data store (not illustrated).

In embodiments, revenue forecasting engine 326 further includes forecast(s) monitor 352 that detects when models are predicting weekly revenue outside expected boundaries. In an embodiment, a ceiling is set on weekly predictions to ensure model prediction stability and avoid outlier predictions. In an embodiment, a maximum rate of change is set, and predictions outside of the rate of change are identified, and model notifications generated to users of the commerce platform system. Such notifications may include the merchant, the weekly totals with which forecasting was made, and the forecasted values, any adjustments made to predictions, etc., to enable model adjustments as needed.

Thus, as discussed above, revenue forecasting engine 326 employs a set of forecasting techniques, which are selected based on actual historic merchant transaction parameters (e.g., processing volume and tenure). The forecasting may therefore adapt to specific merchants, and without requiring input from the merchants. Furthermore, each forecasting technique is used based on the accuracy that it provides for the merchant having the merchant parameters to ensure that the most accurate prediction is made for each merchant given the merchant's unique scenario.

Returning to FIG. 2, offer manager 228 is responsible for accessing the weekly revenue forecasts of a merchant when deciding on the parameters of a service offered to a merchant (e.g., extension of a credit limit, determining a loan amount, determining a loan repayment term, etc.). The offer manager 228 may proactively generate such offers for commerce platform services on a periodic basis, in response to detecting merchants meeting offer criteria, or in response to merchant requests.

As discussed above, commerce platform system 200 is able to leverage its unique position and environment as a modern transaction processing system when making revenue forecasts upon which services may be offered to merchant users of the commerce platform system 200. The revenue forecasts are made directly from the commerce platform system's 200 transaction data, which results in low/zero effort on behalf of merchants for making predictions, increased accuracy as no third parties are relied upon to supply information, and leverages the unique position of the commerce platform as a payment processing entity within a networked and distributed computing environment. Furthermore, by deploying the processed discussed above in FIGS. 2 and 3, as well as below in FIG. 4, as distributed computing solutions with each processing being a job or set of jobs, the techniques herein are able to handle the volume of transaction data generated by the commerce platform system to efficiently make daily, weekly, or other periodic revenue forecasts and/or service offerings.

Figure 4:
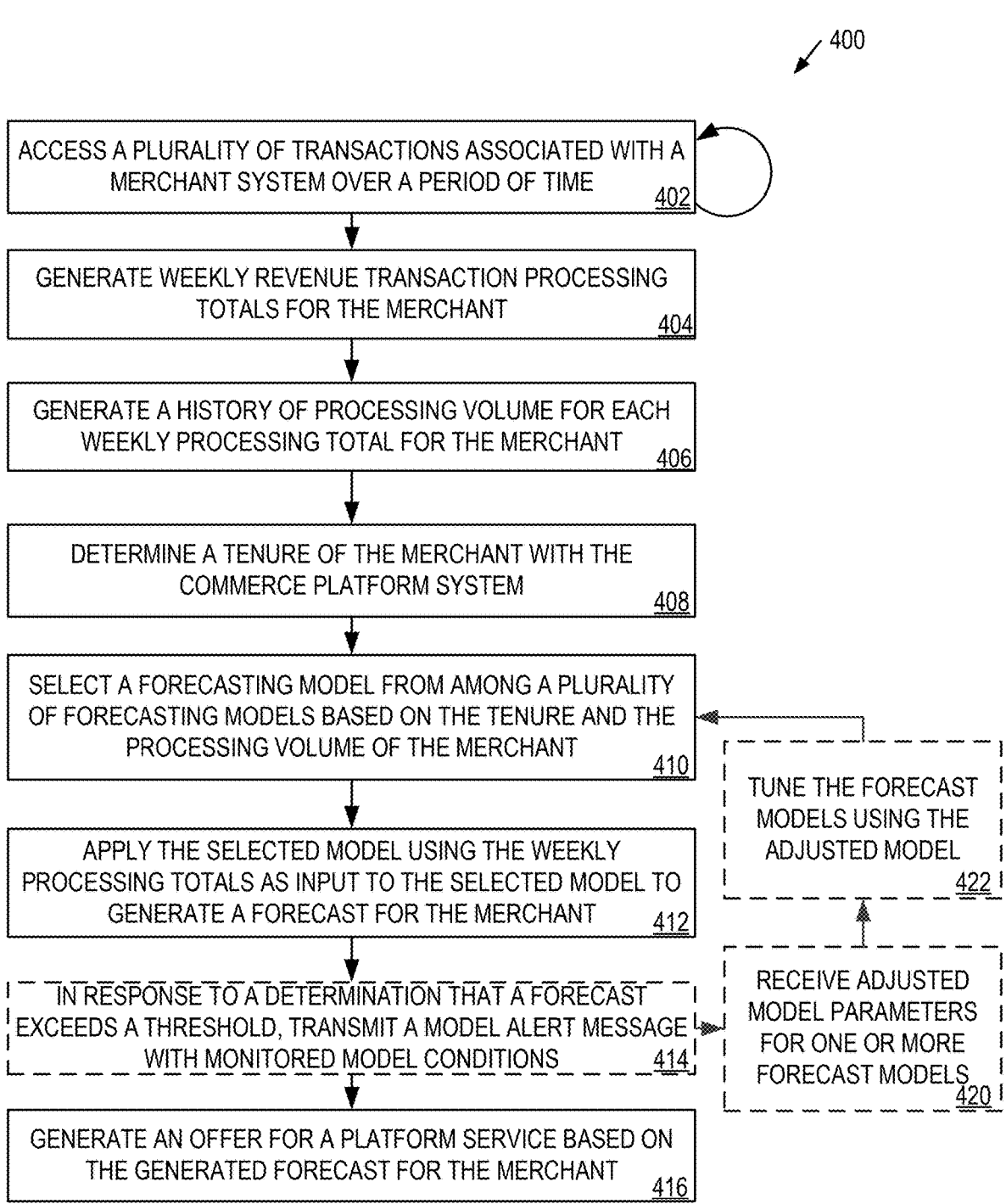
FIG. 4 is a flow diagram a method for leveraging a multi-model approach to produce predictions with greater accuracy and generating tailored content based on such predictions, in accordance with one or more embodiments.

FIG. 4 is a flow diagram of a method 400 for leveraging a multi-model approach to produce predictions with greater accuracy and generating tailored content based on such predictions, in accordance with one or more embodiments. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform system 110 or commerce platform system 200). Furthermore, each of the processing logic operations discussed below may be implemented as a job (or set of jobs) in a distributed computing system, such that multiple instances of each process operation may be executed simultaneously to efficiently perform the forecasting discussed herein at scale.

Referring to FIG. 4, processing logic begins by accessing a plurality of transactions associated with a merchant system processed by a commerce platform system over a period of time (processing block 402). As discussed herein, the transactions are comprised in transaction records associated with a merchant and include data indicative of type of transaction, transaction amount, transaction time, card information, etc. Furthermore, processing logic may access transactions for each merchant on a per-merchant basis.

Processing logic generates weekly revenue transaction processing totals for the merchant (processing block 404). From the weekly transaction totals, processing logic generates a history of processing volume for each merchant (processing block 406), including average weekly processing volume, weekly totals, as well as other processing totals (e.g., 3-month, 12-month, and other processing volume totals). Furthermore, processing logic also determines, from the weekly totals, a tenure of the merchant with the commerce platform (processing block 408). The tenure is indicative of how long the merchant has been conducting transactions with the commerce platform, such as more than a year, within the previous calendar year, etc.

Processing logic then selects a revenue forecasting model from among a plurality of revenue forecasting models based at least in part on the tenure and the processing volume of the merchant (processing block 410). As discussed above, different revenue forecasting models are identified as providing maximum levels of accuracy based on processing volume amount (e.g., <$100 k/yr, or ≥$100 k/yr) as well as based on the history of available data (e.g., tenure <1 year, or tenure ≥1 year). The models include exponential smoothing, heuristic/linear trend, and ML based time forecasting that accounts for seasonality (e.g., PROPHET™ modeling).

Processing logic then applies the selected revenue forecasting model using the weekly revenue transaction processing totals as input to the selected revenue forecasting model to generate a revenue forecast for the merchant (processing block 412). Furthermore, model parameters may be adjusted based on, for example, annualized revenue totals, constant multipliers, caps and floors, etc., as discussed in greater detail above.

In some embodiments, processing logic, in response to a determination that a revenue forecast exceeds a threshold, transmits a model alert message with monitored model conditions (processing block 414). Model alerts may be used when monitoring any of the models discussed herein. Furthermore, in embodiments, the caps and floors above may serve as alert thresholds, as well additional factors such as rate of change indicators may form additional alerting thresholds. The alert message may include conditions associated with the forecast that caused the alert, such as weekly totals, 3-month processing volume, 12-month processing volume, etc. Such factors may be provided to a user of a commerce platform for model analysis and potential adjustment.

When alerting conditions are satisfied, which is indicative of a model prediction outside an expected or acceptable range, processing logic optionally implements a feedback loop where processing logic receives adjusted model parameters for at least one model (processing block 420), such as from an analysist that received the alert message of processing block 414. Processing logic then tunes the model using the received adjusted parameters (processing block 422). Thus, a model that is not performing as expected may be adjusted to improve its ongoing accuracy. Furthermore, an analyst is provided with data associated with a model prediction outside the norms to ensure that external condition associated with a merchant can be eliminated as a cause of the concerning forecast. In this optional tuning loop, the process would return to processing block 410 to regenerate forecasts.

Processing logic then generates an offer for a commerce platform service based on the generated revenue forecast for the merchant (processing block 416). As discussed herein, the service offer may be a type of service that utilizes revenue forecasts as an input to the offer, such as credit offers, loan offers, etc. The offer is then transmitted to the merchant system, for example, as an electronic message, as a graphical user interface within a web page, etc.

Figure 5:
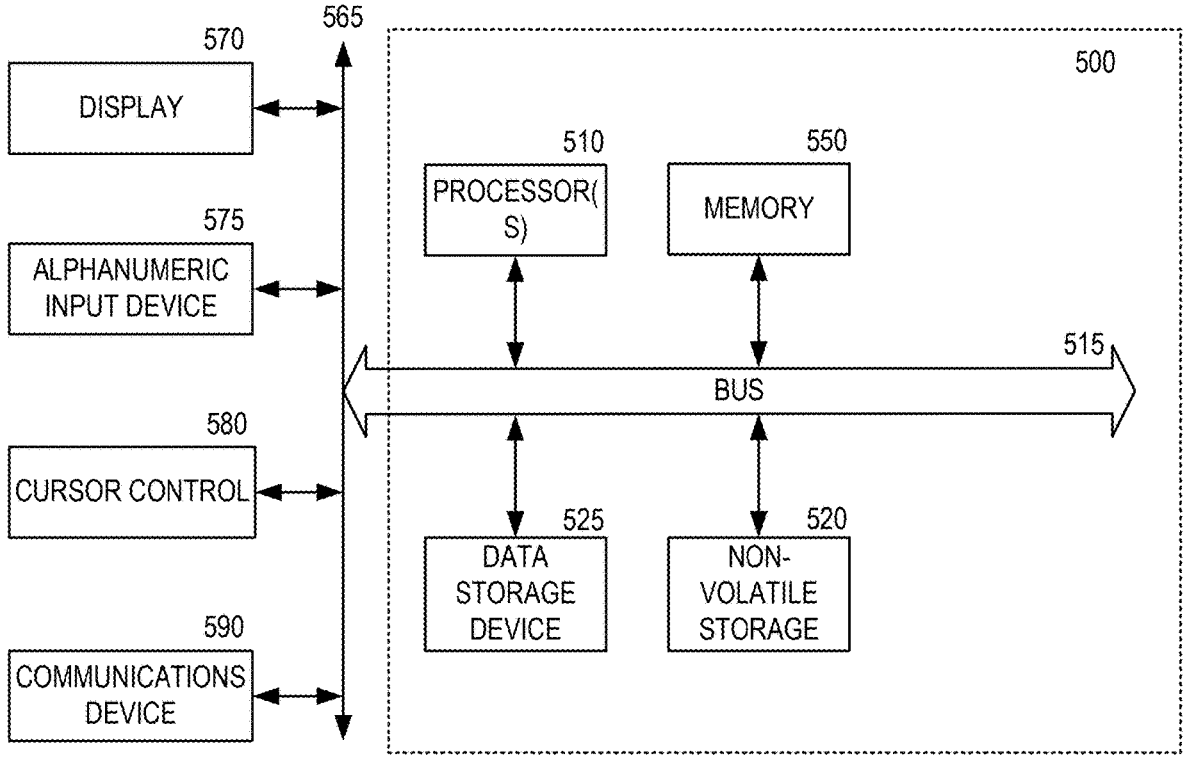
FIG. 5 is a computer system that may be used to support the systems and operations discussed herein, in accordance with one or more embodiments.

FIG. 5 is a block diagram of a computer system that may be used to support the systems and operations discussed herein, in accordance with one or more embodiments. For example, the computer system illustrated in FIG. 5 may be used by a commerce platform system, a merchant system, a user system, etc. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A system for facilitating dynamic model selection for generating an offer, for a platform service, via a multi-model approach, the system comprising:

one or more processors and memory storing instructions that, when executed by the one or more processors, cause operations comprising:

in connection with a network content request provided in a networked and distributed computing environment, determining a processing volume corresponding to data associated with an entity within the networked and distributed computing environment;

selecting, based on one or more conditions being satisfied, wherein the one or more conditions includes a condition that is satisfied when the processing volume satisfies a predetermined threshold, and from a plurality of models that include one or more machine learning models and one or more other types of models, a first model over use of a second model that requires more processing resources than the first model, wherein the second model is configured to be selected, from the plurality of models, when the condition is not satisfied;

generating, based on selecting the first model, and the data, a constant value using the first model to obtain a predicted result for the entity, wherein the second model is configured, when selected, to generate a time series forecasted weekly totals to obtain the predicted result for the entity; and generating the offer, for the platform service, based on the predicted result.

2. The system of claim 1, wherein the processing volume satisfies the predetermined threshold when the processing volume is less than a processing volume threshold.

3. The system of claim 1, wherein the one or more conditions further include a different condition that is satisfied when a processing tenure, of the entity, satisfies a time period threshold.

4. The system of claim 1, wherein the first model is a heuristic model of the one or more types of models, and wherein the second model is a machine learning trend and seasonality model of the one or more machine learning models.

5. A method comprising:

storing a plurality of models;

determining a processing volume corresponding to user data associated with a user;

selecting, based on one or more conditions being satisfied, wherein the one or more conditions includes a condition that is satisfied when the processing volume satisfies a predetermined threshold, and from the plurality of models, a first model, wherein a second model is configured to be selected, from the plurality of models, when the condition is not satisfied, and wherein the second model requires more processing resources than the first model;

generating, based on the user data and the selection of the first model, a constant value to obtain a predicted result related to the user, wherein the second model is configured, when selected, to generate a time series forcasted weekly totals to obtain the predicted result; and generating an offer, for a platform service, based on the predicted result.

6. The method of claim 5, wherein the processing volume satisfies the predetermined threshold when the processing volume is less than a processing volume threshold.

7. The method of claim 5, wherein the one or more conditions further include a different condition that is satisfied when a tenure length, of the user, satisfies a time period threshold.

8. The method of claim 7, wherein the tenure length is a tenure, of the user, with a platform.

9. The method of claim 5, wherein the first model is a heuristic model.

10. The method of claim 5, wherein the second model is a machine learning model.

11. The method of claim 5, wherein the plurality of models further include an exponential smoothing model.

12. The method of claim 5, further comprising one of:

transmitting an electronic message that indicates the offer; or transmitting a graphical interface, within a webpage, that indicates the offer.

13. The method of claim 5, wherein the first model is a heuristic model, and wherein the second model is a machine learning trend and seasonality model.

14. The method of claim 13, wherein the plurality of models further include an exponential smoothing forecaster model.

15. One or more non-transitory computer-readable media storing instructions that, when executed by one or more processors, cause operations comprising:

storing a plurality of models;

determining a processing volume corresponding to use data associated with a user;

selecting based on one or more conditions being satisfied, wherein the one or more conditions includes a condition that is satisfied when the processing volume satisfies a predetermined threshold, and from the plurality of models, a first model, wherein a second model is configured to be selected, from the plurality of models, when the condition is not satisfied, and wherein the second model requires more processing resources than the first model;

generating, based on the user data and the selection of the first model, a constant value to obtain a predicted result related to the user, wherein the second model is configured, when selected, to generate a time series forecasted weekly totals to obtain the predicted result; and generating an offer, for a platform service, based on the predicted result related to the user.

16. The one or more non-transitory computer-readable media of claim 15, wherein the processing volume satisfies the predetermined threshold when the processing volume is less than is a processing volume threshold.

17. The one or more non-transitory computer-readable media of claim 15, wherein the one or more conditions further include a different condition that is satisfied when a tenure length, of the user, satisfies a time period threshold.

18. The one or more non-transitory computer-readable media of claim 17, wherein the tenure length is a tenure, of the user, with a platform.

19. The one or more non-transitory computer-readable media of claim 15, the operations further comprising:

wherein the second model is a machine learning model.

20. The one or more non-transitory computer-readable media of claim 15, wherein the plurality of models further include an exponential smoothing model.

* * * * *